United States Patent [19]

Stumpf

[11] 4,234,983
[45] Nov. 25, 1980

[54] THERMALLY WELDED SPRING POCKETS

[75] Inventor: Walter Stumpf, Munster, Ind.

[73] Assignee: Simmons Company, Atlanta, Ga.

[21] Appl. No.: 947,545

[22] Filed: Oct. 2, 1978

Related U.S. Application Data

[63] Continuation of Ser. No. 790,462, Apr. 25, 1977, abandoned.

[51] Int. Cl.² ............................................. A47C 27/04
[52] U.S. Cl. ............................................. 5/477; 5/246; 5/475
[58] Field of Search ............... 5/246, 477, 478, 475; 297/219, 452, 456; 29/91.1, 91.5; 53/28, 418, 39, 46, 114, 180

[56]  References Cited

U.S. PATENT DOCUMENTS

| | | | |
|---|---|---|---|
| 2,615,180 | 10/1952 | Wolley | 5/477 |
| 2,983,236 | 5/1961 | Thompson | 112/2 |
| 3,046,574 | 7/1962 | Crenberg et al. | 5/474 |
| 3,113,225 | 12/1963 | Kleesattel | 310/26 |
| 3,419,447 | 12/1968 | Hewett | 156/73 |
| 3,430,098 | 11/1947 | Bineh | 5/477 |
| 3,459,610 | 8/1969 | Digkers et al. | 156/73 |
| 3,483,073 | 12/1969 | Pounder et al. | |
| 3,505,136 | 4/1970 | Attwood | 156/73 |
| 3,562,041 | 2/1971 | Robertson | 156/73 |
| 3,577,292 | 5/1971 | Obeder | 156/73 |
| 3,668,816 | 6/1972 | Thompson | 53/418 |
| 3,728,183 | 4/1973 | Wasco et al. | 156/73 |
| 3,733,238 | 5/1973 | Long et al. | 156/528 |
| 3,837,977 | 9/1974 | Rust, Jr. | 156/580.1 |
| 3,844,869 | 10/1974 | Rust, Jr. | 156/358 |
| 3,869,739 | 3/1975 | Klein | 5/477 |
| 3,874,963 | 1/1975 | Borger | 156/73.2 |
| 3,912,576 | 10/1975 | Braun | 156/580 |

Primary Examiner—Casmir A. Nunberg
Attorney, Agent, or Firm—Fitch, Even, Tabin, Flannery & Welsh

[57]  ABSTRACT

Individually pocketed upholstery springs for assembly into so-called Marshall construction, in which the pockets containing the individual springs are formed between the overlaid plies of a two-ply strip of material by lines of separate individual welds which connect the plies together.

5 Claims, 5 Drawing Figures

THERMALLY WELDED SPRING POCKETS

This is a continuation of application Ser. No. 790,462 filed Apr. 25, 1977 now abandoned.

This invention relates to spring assemblies for mattresses, cushions, and the like, and more particularly to connected series of individually-pocketed springs for matresses and cushions having the so-called Marshall construction.

In such units, each spring coil is encased within its own fabric sack, which is usually made in the form of a pocket defined between two plies of a fabric strip connected together at intervals by transverse stitching. The two-ply strip is usually formed by folding a strip of double width upon itself along its longitudinal midline, leaving the overlapped plies along the unjoined opposite edge of the strip to be connected to each other to close the pocket after the spring is inserted.

A variety of techniques have evolved for the manufacture of pocketed springs, some contemplating the creation of the pockets within the fabric plies prior to insertion of the wire spring and others the insertion of the coaxially compressed wire springs between the plies of the strip and the subsequent creation of the pockets by stitching the two plies to each other along transverse lines between adjacent springs. In either technique, the pocket is closed after the insertion of the spring, usually be stitching the two plies together along a line parallel to the free edges of the plies.

The present invention relates to a particular form of such a series of pocketed springs in which the overlaid fabric plies are secured to each other along the transverse and longitudinal lines of attachment earlier referred to by thermal welding rather than by the use of stitching, as had conventionally been done. In particular, the invention contemplates a series of pocketed springs in which the pocket fabric is thermally weldable to itself so that the two plies of fabric of the folded strip in which the pockets are defined may be secured together without the necessity for stitching.

A more particular object of the invention is the joining of the overlaid plies in a manner such as to provide a stronger bond than is achieved in the same fabric material by production sewing, and, at the same time, the elimination of any need for the thread and the sewing apparatus which was heretofore necessary to the manufacture of upholstery springs of this type. The mechanical requirements upon sewing machines for this service are severe, and the mechanisms required for moving the sewing machines in relation to the work, particularly in making the transverse stitching which defines the pockets, has of necessity been complicated in machines of high speed, whose productivity is limited by the limitations of the sewing machines, including the problem of thread breakage. In contrast, the utilization of thermally weldable materials promises substantial simplification of the manufacture of superior springs in accordance with this invention.

The invention will be readily understood from the following description made in reference to the accompanying drawings, of which:

FIG. 1 is a fragmentary plan view of a series of pocketed springs made in accordance with the invention, and shown with the springs axially compressed in the position of their insertion between the fabric plies and before their respective axes have been turned into alignment with the longitudinal axes of the pockets;

FIG. 2 is a top view of such a series of pocketed springs after the axially compressed springs have been rotated through 90 degrees from the FIG. 1 position to cause their axes to coincide with the long axis of the spring pocket. In the process of being turned, the springs expand to the extent permitted by the distended height of the pockets, and the series of springs becomes shorter as the two overlaid plies in which the pockets are formed are separated by the expanded springs;

As already indicated, the fabric material used in the practice of the invention must be thermally weldable, either because of the inherent characteristics of its constituent fibers or by reason of the application of a thermoplastic film, layer, or coating attached to the fabric or otherwise supplied at the site of the desired attachment of the two plies to each other.

From an operational standpoint, it is far simpler to employ for this purpose a fabric composed of fibers which are thermoplastic, and that is the illustrated and preferred form of the invention, although it has been practiced also by using added materials under certain circumstances later herein described.

I have found a very satisfactory fabric for the preferred form in a non-woven polypropylene fabric consisting essentially of a carded web of staple fibers which are bonded to form a fabric of substantially uniform thickness throughout and of substantially uniform strength in cross directions in the plane of the fabric.

The above-mentioned material in which the staple fibers are entirely polypropylene, and which has a basis weight of 2.2 to 4 ounces per square yard, has provided especially satisfactory results when handled in the manner hereinafter described.

Figure 1:
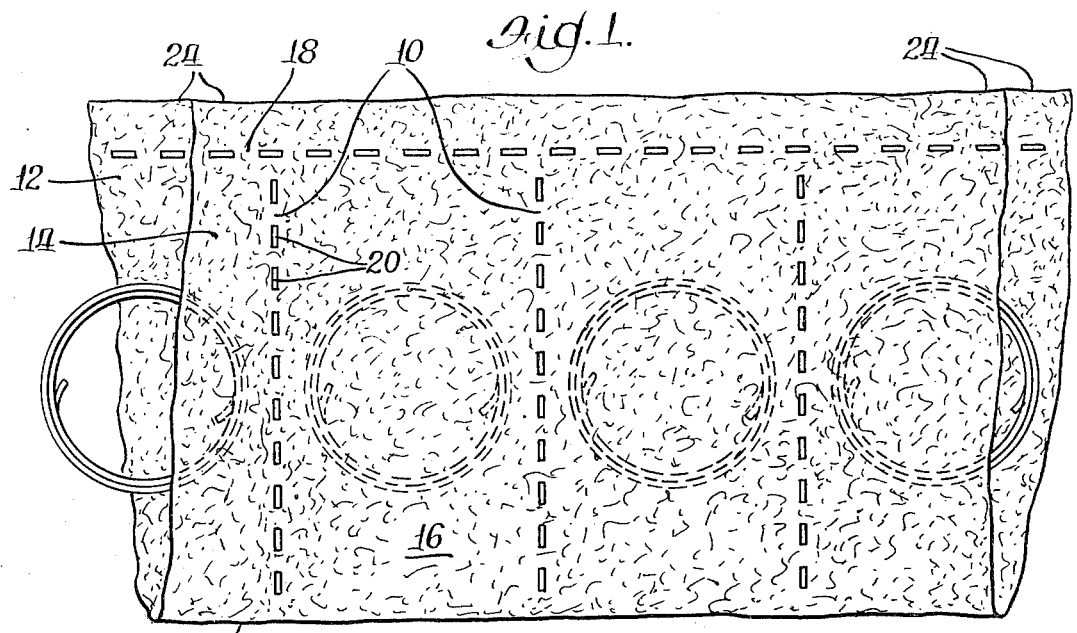
Figure 4:
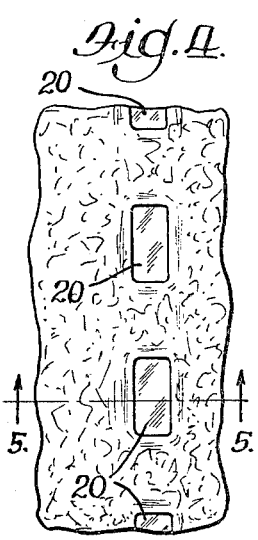
FIG. 4 is an enlarged fragmentary view of the series of welds which form the line of attachment of the fabric plies to each other.

As illustrated in FIGS. 1 and 4, the transverse lines of attachment 10 of the overlaid plies 12 and 14 of the strip 16 to each other to define the spring pockets, as well as the line 18 of attachment which closes the pockets along the side edges of the plies between which the spring was inserted, are formed of discrete individual welds 20 rather than as a continuous weld. It will also be observed that, as illustrated, the individual welds 20 are spaced apart within the line by a distance approximately equal to the length of the individual welds along the line, and, further, that the welds at each end of the transverse lines 10 of welds between the pockets do not intercept either the folded edge 22 of the fabric strip 16 or its overlaid edges 24 between which the spring was inserted. Both features serve a particular purpose in achieving the desired result, which can better be appreciated by particular reference to FIGS. 4 and 5.

Figure 5:
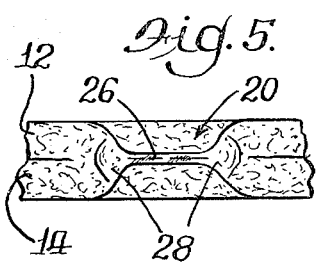
FIG. 5 is an enlarged sectional view taken on the line 5—5 of FIG. 4.

From FIGS. 4 and 5, it can be appreciated that at the site of each weld 20, the pocket fabric, which is essentially opaque, becomes an almost transparent panel or film 26 at the site of the weld by the fusion of the individual fibers into a conglomerate whole. This film is quite thin in comparison to the thickness of the fabric, and is both stiffer and weaker than the surrounding fabric, and may be fractured more readily than the fabric itself. A continuous weld, accordingly, is less satisfactory for the purpose because it creates a line of weakness in the connected series of pockets which can create handling problems in the subsequent use of the pocketed springs in the making of spring assemblies or "constructions" to be incorporated into mattresses or cushions.

Figure 2:
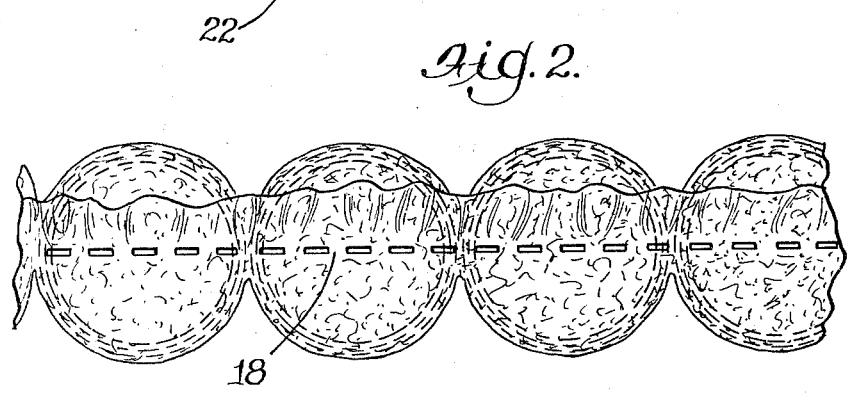
Figure 3:
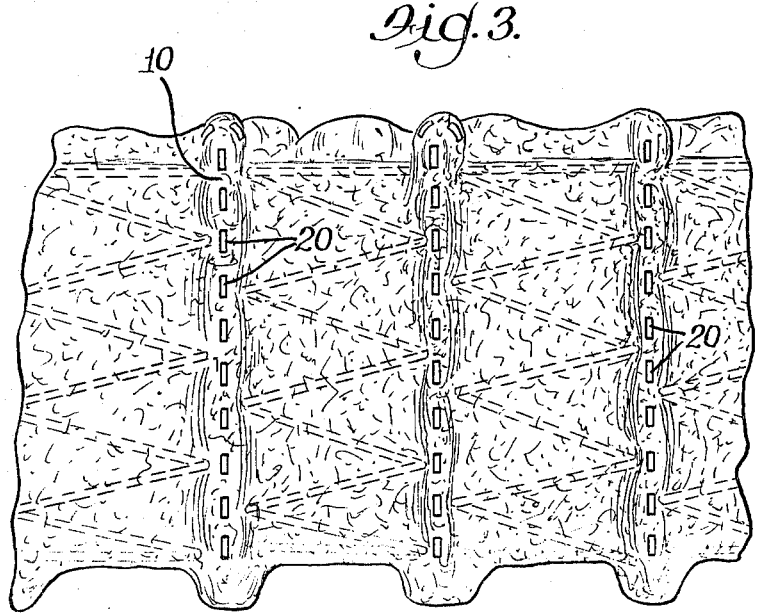
FIG. 3 is an elevational view of the series of pocketed springs shown in FIG. 2.

I find it desirable, therefore, for the sake of the tensile strength of the entire series or belt of pocketed springs, such as illustrated in FIGS. 2 and 3, to interrupt the line of the weld, and, for the same reason, to place the first individual weld at each end of the transverse lines of welds inwardly from the side edges of the strip so as not to create an initial point of weakness which might otherwise permit the initiation of a tear of the entire strip by the successive tensile fracture of each interweld width of fabric along the entire line.

As to the efficacy of the interrupted weld to provide a secure bond between the two plies of fabric in the preferred form illustrated, the arrangement of the interrupted welds in my selected proportion provides bonding strength between the plies which is at least equivalent to a continuous line of weld. This will become apparent from examination of FIGS. 4 and 5, and from the further consideration that although each individual weld appears as an almost transparent "window" 26 through the two opaque plies 12 and 14, there is necessarily a transitional area 28 in a band around the window in which the discrete fibers of the fabric have not totally lost their fibrous identity but are nevertheless fused to one another within each ply and between the plies. It seem apparent that the strength of the weld is attributable in larger part to that interfiber fusion rather than from the film which results in the area of the greatest applied energy. Accordingly, by spacing the individual welds as far apart as the length of each individual weld and by making the individual weld approximately half as wide as it is long, the fused fiber bands 28 which surround the "window pane" of each weld provide each pocket with a length of welded fabric equivalent to that which would result from a continuous weld. re nevertheless fused to one another within each ply and between the plies. It seem apparent that the strength of the weld is attributable in larger part to that interfiber fusion rather than from the film which results in the area of the greatest applied energy. Accordingly, by spacing the individual welds as far apart as the length of each individual weld and by making the individual weld approximately half as wide as it is long, the fused fiber bands 28 which surround the "window pane" of each weld provide each pocket with a length of welded fabric equivalent to that which would result from a continuous weld.

Moreover, by preserving the continuum of the fibrous strip fabric in the interweld spaces, I maintain the tensile integrity of the entire band or series of pocketed springs, while at the same time providing all of the essential bonding strength between the plies to withstand the tensile forces created in the plies by the expanded spring and by the ultimate use to which assemblies of such springs are put.

With an interrupted line of thermal welds as described, and using nonwoven polypropylene fabric earlier referred to, I have found that a line of interrupted welds each a quarter-inch long and approximately one-eighth inch wide and separated from each other by approximately one-quarter inch in the line, exhibits over forty percent (40%) greater resistance to separation of the pocket-forming plies than the identical material sewed on production equipment for the manufacture of pocketed springs by the conventional stitching method, using thread which is conventional for the single-thread interpocket stitching, viz., Number 30-3 soft cotton.

While thermal welding in the prescribed pattern may be achieved in a variety of ways, including contact heating and high frequency welding, the ultrasonic welding technique appears to be especially suitable in that the internal induction of heat by its mechanical working of the material is faster than contact heating, and more controllable as well as less dangerous than high-frequency electrostatic methods. Moreover, within limits, any desired pattern of welding can be achieved ultrasonically in this context by suitable modification of the anvil against which the material to be welded is pressed by the welding horn.

I have also made pocketed springs using other thermoplastic fabrics, such as a nonwoven polyethylene composed of continuous fibers which are laid en masse and subsequently partially fused by heat and other processing into a sheet fabric material. In economic weights of this material, however, I have found the control of the weld more difficult than I prefer for production purposes, but nevertheless controllable independently of the welding process by the inclusion along the line of the weld of an additional film, layer, or band of thermoplastic material.

These experiences lead me to conclude as well that satisfactory control of the weld in lighter weight thermoplastic fabrics may be accomplished by the inclusion of a non-thermoplastic matrix, such as cotton scrim, between the plies along the line of the weld to provide a non-fusible network to which the thermoplastic fabric can bond itself, and, conversely, that similarly satisfactory welding may be achieved between two layers of woven textile fabrics of natural fibers, such as cotton, etc., if a thermoplastic material is included between the plies in the line of the weld.

What is claimed is:

1. In a series of pocketed springs for use in the manufacture of mattresses or cushions or the like comprising a strip of integrally-connected closed fabric pockets each containing a helically coiled wire compression spring having its axis disposed transversely of the strip, and wherein said pockets are defined between two overlapped plies of fabric strip by spaced transverse lines of discrete attachments of the plies to one another and by connection of said plies together along spaced longitudinal lines, the improvement wherein said fabric is thermally weldable to itself and said discrete attachments are spaced individual welds.

2. The subject matter of claim 1 wherein said individual welds are uniformly spaced and elongated in the direction of said lines of attachment.

3. The subject matter of claim 2 wherein the end welds of said transverse lines of attachment are spaced from the side edges of the plies.

4. The subject matter of claim 2 wherein said welds are rectangular in shape, approximately one-quarter inch long, and approximately half as wide, and occupy approximately one half of the length of said lines of attachment.

5. The subject matter of claim 1 in which at least one of said longitudinal lines of connection between the plies is also a line of spaced individual welds.

* * * * *

UNITED STATES PATENT AND TRADEMARK OFFICE
CERTIFICATE OF CORRECTION

PATENT NO. : 4,234,983
DATED : November 25, 1980
INVENTOR(S) : Walter Stumpf

It is certified that error appears in the above–identified patent and that said Letters Patent are hereby corrected as shown below:

In Column 3, line 29, "seem" should read --seems--;

In Column 3, delete the repetitious text beginning after the period in line 38 and ending with the period in line 50.

Signed and Sealed this

Third Day of March 1981

[SEAL]

Attest:

RENE D. TEGTMEYER

*Attesting Officer*     *Acting Commissioner of Patents and Trademarks*

Disclaimer

4,234,983.—*Walter Stumpf*, Munster, Ind. THERMALLY WELDED SPRING POCKETS. Patent dated Nov. 25, 1980. Disclaimer filed Apr. 25, 1984, by the assignee, *Simmons U.S.A. Corp.*

Hereby enters this disclaimer to claims 1, 2, 4 and 5 of said patent.
[*Official Gazette July 10, 1984.*]